May 26, 1959    R. L. SHALLENBERG    2,887,993
NON-THROTTLED SPARK IGNITION ENGINE
Filed Oct. 15, 1956    3 Sheets-Sheet 1
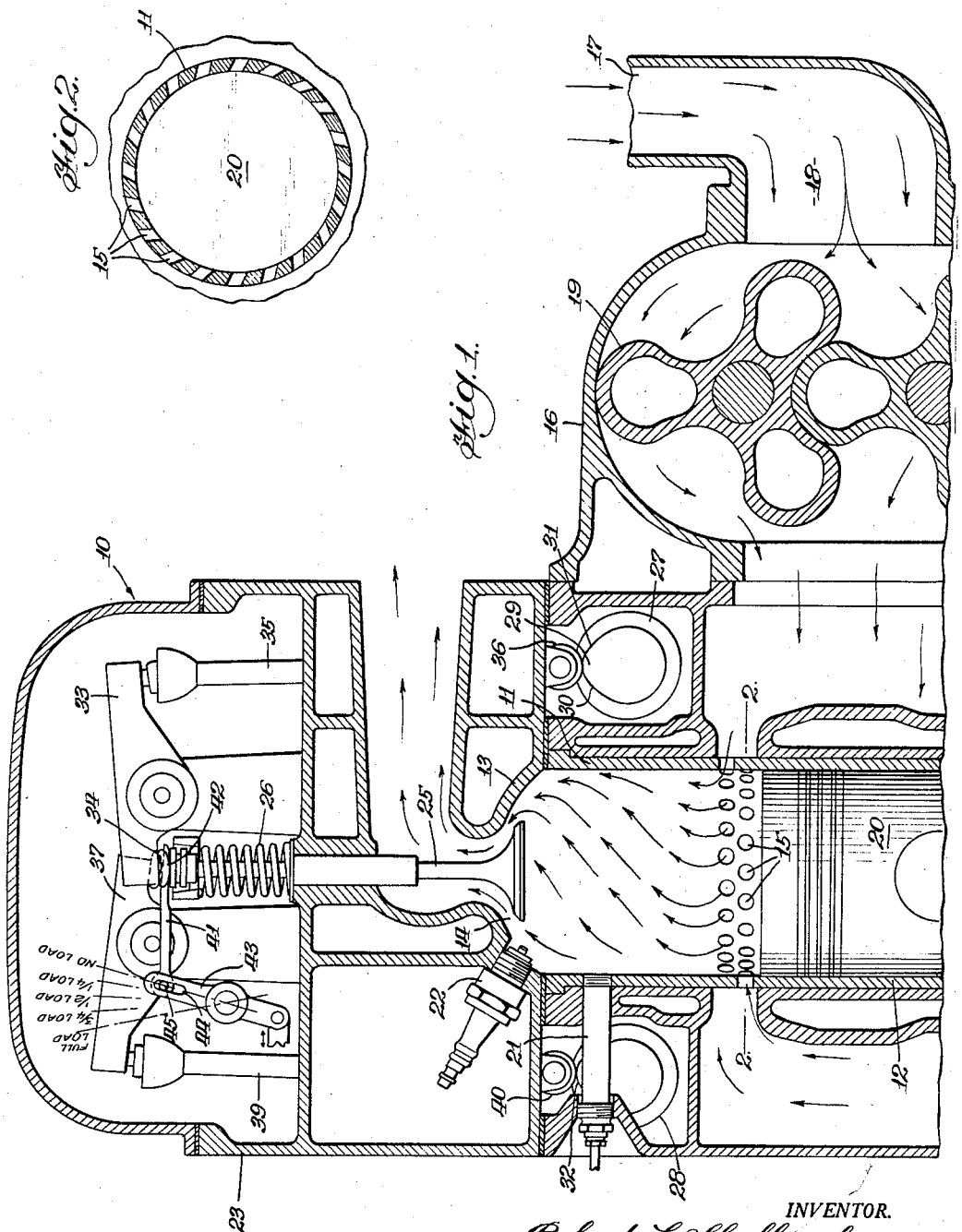
INVENTOR.
Robert L. Shallenberg
BY Paul O. Pippel
Atty.

May 26, 1959 R. L. SHALLENBERG 2,887,993
NON-THROTTLED SPARK IGNITION ENGINE
Filed Oct. 15, 1956 3 Sheets-Sheet 2
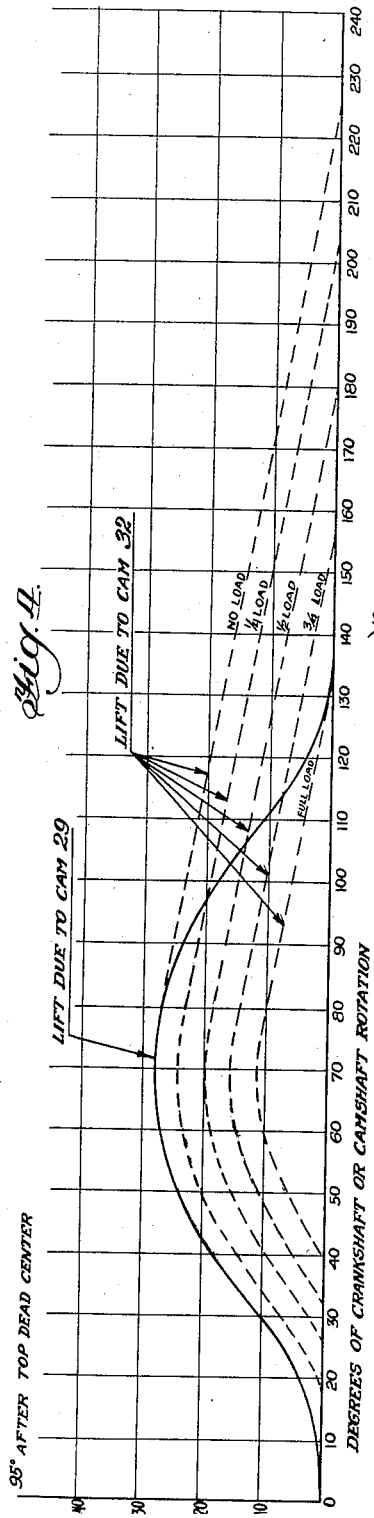
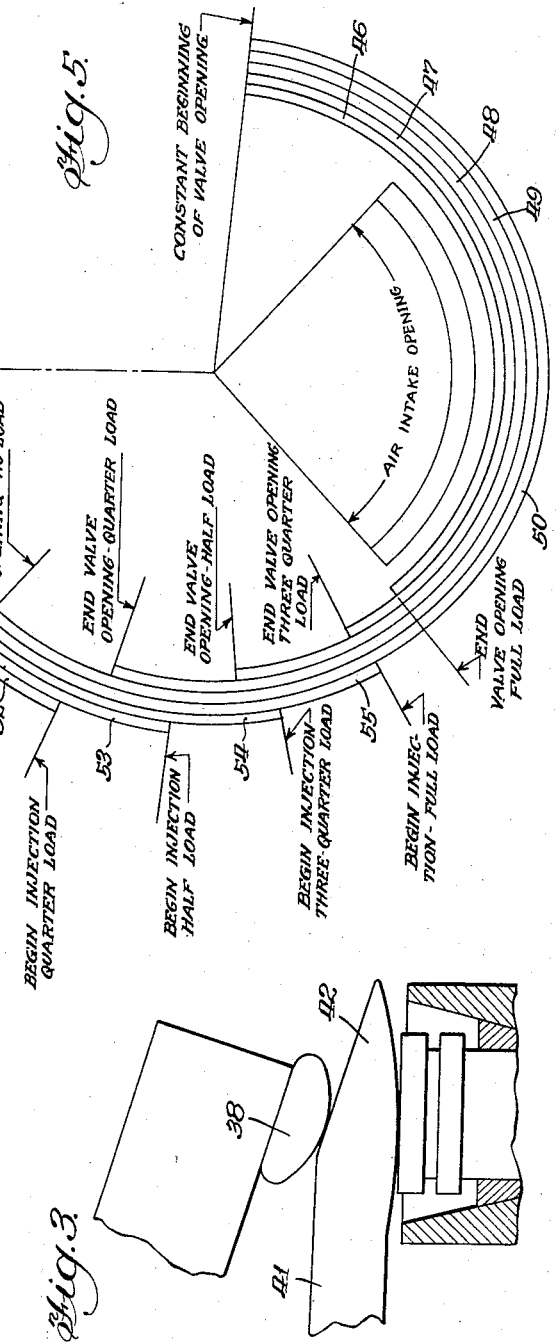
INVENTOR.
Robert L. Shallenberg
BY Paul O. Pippel
Atty.

May 26, 1959 R. L. SHALLENBERG 2,887,993
NON-THROTTLED SPARK IGNITION ENGINE
Filed Oct. 15, 1956 3 Sheets-Sheet 3

INVENTOR.
Robert L. Shallenberg
BY
Paul O. Pippel
Atty.

United States Patent Office 2,887,993
Patented May 26, 1959

2,887,993

NON-THROTTLED SPARK IGNITION ENGINE

Robert L. Shallenberg, Wheaton, Ill., assignor to International Harvester Company, a corporation of New Jersey Application October 15, 1956, Serial No. 615,806

7 Claims. (Cl. 123—32)

This invention relates to internal combustion engines and is primarily concerned with a non-throttled spark ignition engine.

An object of the invention is to provide a spark ignition engine wherein there is a reduction of pumping losses to give more power and better economy at part loads on the engine.

Another object of the invention is to provide a spark ignition engine that can be easily converted into a diesel engine to give economy in manufacture and servicing in the field because of the same structure.

The foregoing and other objects of the invention will be apparent from the construction and arrangement illustrated in the accompanying drawings wherein:

Figure 1 is a cross sectional view through the spark ignition engine of the present invention.

Figure 2 is a sectional view taken on the line 2—2 of Figure 1,

Figure 6:
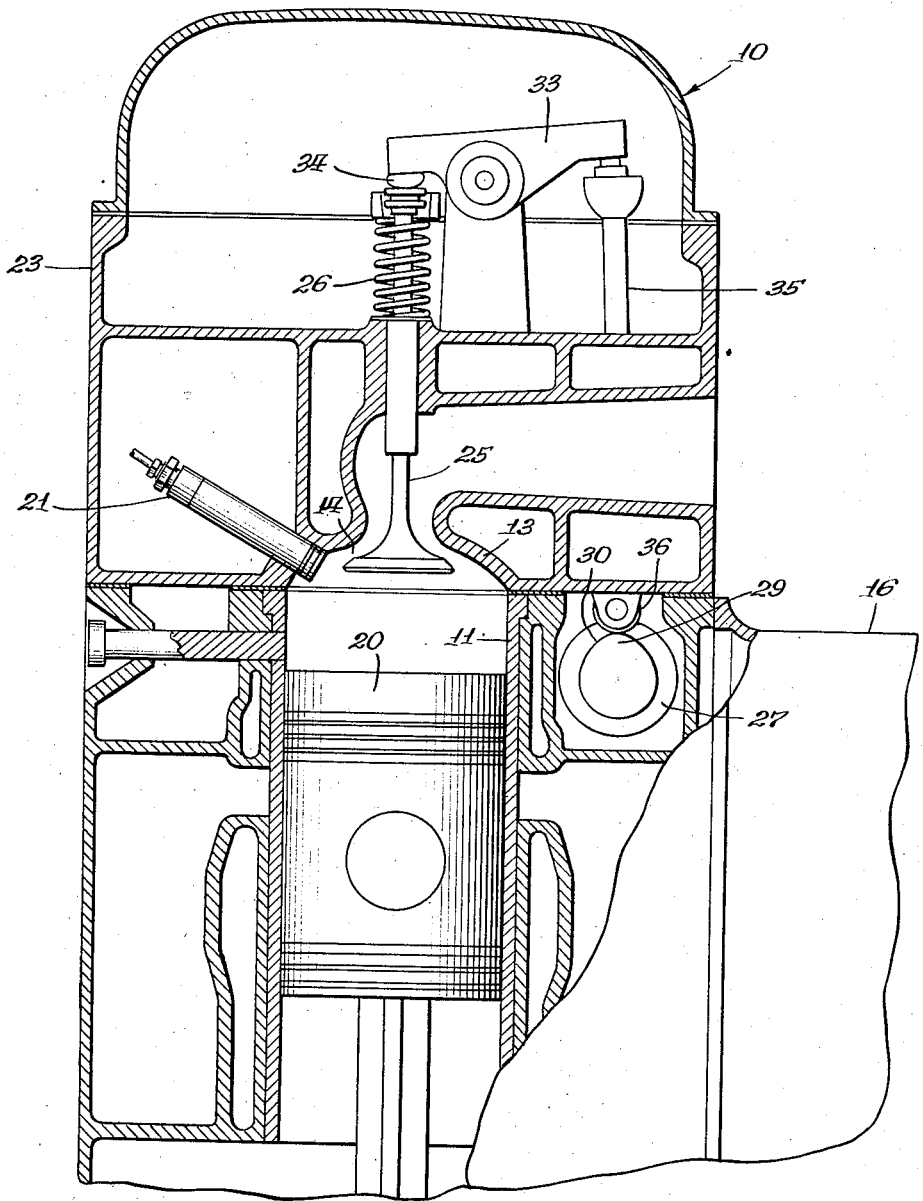

Figure 3 is a fragmentary view of the exhaust valve plunger and the mechanism for retarding the closing of the exhaust valve on the compression stroke, Figure 4 is a graph showing the various positions of the exhaust valve, Figure 5 is an exhaust valve and injection timing diagram, and Figure 6 is a cross sectional view through the spark ignition engine of the present invention showing it converted into a diesel engine.

Spark ignition engines differ from compression ignition engines in several ways, but the most important factor is the type of control exercised. Since, in a diesel (or compression ignition) engine, ignition occurs at each particle of fuel due to the high temperature of the compressed air, no flame travel is necessary to achieve combustion and any amount of fuel from no load quantities to full load quantities can be introduced and combustion will occur. This provides an excess of air at any load and a tremendous excess at no load. In a spark ignition engine where combustion is originated at the spark plug, combustion of the entire mixture is dependent upon flame travel through the fuel-air mixture from the spark source. Flame travel can only occur in a "combustible mixture" and this has been found to be approximately fifteen parts of air to one part of fuel by weight. The actual limits beyond which combustion will not occur is approximately seven-one to seventeen-one. This then means that one cannot arbitrarily change the amount of fuel supplied to control load as in the diesel engine. In the spark ignition engine both air and fuel must be decreased as the load is decreased in order to maintain an efficient mixture ratio. This leads to "throttling" or restricting the flow of air to an engine at part loads and introduces excessive pumping losses at any load other than full. Since most engine applications require operation at part load a majority of the time, it would obviously be desirable to devise some other method of controlling the amount of air present in the cylinder at the end of the compression stroke.

The invention proposes a spark ignition engine wherein a full charge of air is drawn in during every intake period and spill metering is applied to get rid of whatever portion of the air that cannot be used. This is accomplished by retarding the closing of the exhaust valve during the compression stroke for a two cycle engine. The quantity of fuel injected into the cylinder is controlled by the fuel injection pump. This engine enables both air and fuel to be decreased as the load is decreased in order to maintain an efficient mixture ratio and reduces pumping losses. The engine is comprised of a piston and cylinder with intake air openings in the cylinder wall and an exhaust valve in an end of the cylinder. A fuel injection nozzle and a spark plug are mounted in the cylinder. Mechanism operated from the engine crankshaft is operative to open the exhaust valve and retard its closing and means are provided to close the exhaust valve. Intake air is moved into the cylinder and the excess air is moved out of the cylinder during the compression stroke through the exhaust valve which has been opened by the mechanism. After the excess air is moved out of the cylinder the mechanism closes the exhaust valve and then fuel is injected into the cylinder and the spark plug ignites the mixture and the piston is moved in the opposite direction and thereafter the exhaust valve opens resulting in the discharge of the exhaust gases.

In the drawings, 10 generally designates a two cycle spark ignition engine having a cylinder 11 including a circular wall 12 and an end 13 secured to the circular wall. The cylinder is provided with an exhaust opening 14 in the end 13 and a spaced pair of series of openings 15 are spaced around the wall intermediate the ends of the cylinder. Each opening 15 is disposed at an angle. That is, the longitudinal centerline of the particular opening 15 is disposed at an angle with respect to a line drawn through the center of the cylinder and the point of intersection of the longitudinal centerline and the periphery of the cylinder. A casing 16 surrounds the cylinder 11 and is secured thereto and has an opening 17 for intake air and the intake air flows into a chamber 18. A blower 19 is rotatably mounted in the casing 16 and geared to the engine crankshaft and moves intake air from the opening 17 through openings 15 into the cylinder 11. A piston 20 is disposed in the cylinder 11 and is operatively connected to the engine crankshaft. A fuel injection nozzle 21 is mounted in the cylinder wall 12 and is operatively connected to a fuel injection pump connected to a governor and the governor is operatively connected to the engine crankshaft. A spark plug 22 is threaded into an opening in the end 13 of the cylinder. A structure 23 is disposed at the end 13 of the cylinder and is secured to the cylinder and is provided with an exhaust passage 24 in communication with the exhaust opening 14. An exhaust valve plunger 25 is slidably mounted in the structure 23 and has a disc disposed in the exhaust opening 14. Resilient means in the form of a coil spring 26 engages the structure 23 and the plunger 25 and urges the plunger toward a position closing the exhaust opening 14. A pair of shafts 27 and 28 are disposed transversely of the cylinder 11 on opposite sides thereof and are rotatably mounted in the casing 16 and are operatively connected to the engine crankshaft. A cam 29 is fixedly secured on the shaft 27 and has an upward slope 30 and a downward slope 31 and the upward and downward slopes have the same curvature. A cam 32 is fixedly secured on the shaft 28 and has an upward slope having the same curvature as the upward slope of cam 29 and has a downward slope that is gradual and longer than the downward slope of cam 29. An arm 33 is pivotally mounted intermediate its ends in the structure 23 and has an engaging portion 34 on one end thereof which engages the valve plunger 25. A rod 35 is loosely mounted in an opening in the structure 23 so that it can reciprocate freely and is universally connected to the other end of the arm 33 and has a roller 36 thereon which engages the cam 29. An arm 37 is pivotally mounted intermediate its ends on the structure 23 and has an engaging portion 38 on one end thereof. A rod 39 is loosely mounted in an opening in the structure 23 so that it can reciprocate freely and is universally connected to the other end of the arm 37 and has a roller 40 thereon which engages the cam 32. An element 41 has a wedge 42 on one end and the wedge is disposed between the engaging portion of the arm 37 and the valve plunger 25. A member 43 is pivotally mounted intermediate its ends on the structure 23 and is provided with a longitudinally extending slot 44 adjacent one end thereof. A pin 45 is fixedly secured on the other end of the element 41 and is slidably disposed in the slot 44 in the member. The other end of the member 43 is operatively connected to the same governor as the fuel injection pump. The member 43 instead of being connected to the governor could be manually controlled. The member 43 may be moved from "No load," through "Quarter load," "Half load," "Three-quarter load" and "Full load" positions, these specific positions as shown in Figure 1 and the member is shown in the "No load" position in this figure.

In Figure 4 is shown an exhaust valve lift curve with "Degrees of crankshaft or camshaft rotation" as abscissas and "Exhaust valve lift" as ordinates. As indicated in the figure the exhaust valve lift begins 95 degrees after top dead center. The lift of the valve due to cam 29 is shown by a solid line and the lift of the valve due to cam 32 is shown in dotted lines for "No load," "Quarter load," "Half load," "Three-quarter load" and "Full load."

In Figure 5 is shown an exhaust valve and injection timing diagram. In this figure there is indicated how long the openings 15 are uncovered by the piston in degrees of crankshaft rotation as indicated by "Air intake opening." The exhaust valve opens at the same time for any engine load as indicated "Constant beginning of valve opening" and segment 46 shows when valve opening is ended for full load and segment 47 shows when valve opening is ended for three-quarter load and segment 48 shows when valve opening is ended for half load and segment 49 shows when valve opening is ended for quarter load and segment 50 shows when valve opening is ended for no load. In Figure 5 there is indicated "Constant ending of injection" and segment 51 shows when injection is begun for no load and segment 52 shows when injection is begun for quarter load and segment 53 shows when injection is begun for half load and segment 54 shows when injection is begun for three-quarter load and segment 55 shows when injection is begun for full load.

The mode of operation of the engine at no load is as follows: Air is drawn into the chamber 18 by blower 19 and is moved by the blower through the openings 15 into the cylinder 11 while the piston is uncovering the openings. At this time cam 29 has engaged roller 36 moving rod 35 away from the cylinder causing arm 33 to contact valve plunger 25 and move the plunger into the cylinder against the force of the spring 26 resulting in the passage 14 being opened. This allows excess air to move out of the cylinder through opening 14. Rotation of shaft 28 has caused cam 32 to engage roller 40 moving rod 39 away from the cylinder and causing arm 37 to engage wedge 42. Arm 37 will retard the closing of the opening 14 until the right amount of air is in the cylinder. When the wedge 42 is inserted to the "No load" position the lift due to cam 32 matches the lift due to cam 29 up to approximately 80 degrees and then exceeds it, holding the valve open to 230 degrees as shown in Figure 4. Then, spring 26 will move plunger 25 to close opening 14. As soon as the exhaust valve closes fuel will be injected into the cylinder through injection nozzle 21. The air and fuel will be mixed and the spark plug will ignite the mixture causing combustion to take place. When combustion takes place the piston will be moved away from the combustion end of the cylinder and thereafter the exhaust opening 14 will be opened through cam 29, roller 36, rod 35, arm 33 and plunger 25 to allow the exhaust gases to be moved out of the cylinder by blower 19. Further movement of the piston in the same direction uncovers the openings 15 and allows a new charge of air to enter the cylinder. Cam 29 is the primary cam which always opens the valve. The effect on the valve lift due to cam 32 is variable and controls only the closing of the valve. Whenever the lift of the valve is greater due to cam 29 than cam 32, then cam 32 is not in contact with the valve. Cams 29 and 32 could be mounted on the same shaft. The exhaust valve could be made to operate with other types of mechanical devices or with a hydraulic system.

Since low pressure always exists in the cylinder immediately following the exhaust valve closing, low pressure injection at this time is feasible and allows a less expensive system than high pressure injection. The injection nozzle in this engine could be located either in the cylinder head or on the wall of the cylinder bore. The latter is preferred because the nozzle would be afforded protection from combustion by the covering piston.

In applicant's engine, excellent swirl of the air can be achieved by the angled intake ports to promote good mixing of fuel and air on the compression stroke. The single valve in the head allows exceptionally good combustion chamber design. The flow of excess air past the exhaust valve will promote a cool valve and assist in preventing detonation of the charge. The two cycle engine is preferred for the simplicity of structure and the greater power output obtainable from the same space and weight. The arrangement shown in the drawings could be applied to a four cycle spark ignition engine by reopening the exhaust valve during the beginning of the compression stroke. The advantages of using a valve for spilling excess intake air on both two and four cycle engines are high part load economy due to elimination of throttling and the allowance of high compression ratios due to good combustion chamber design and cool running exhaust valve and the allowance of multi-fuel operation. The advantages of using a valve for spilling excess intake air on a two cycle engine in addition to those just recited are good two cycle construction to provide high output from small space and weight and very economical engine construction and is easily air cooled and the uniflow scavenging permits very high speed operation.

The spark ignition engine shown in the drawings could be converted into a diesel engine by removing spark plug 22 and removing injection nozzle 21 and plugging up the hole in the cylinder wall from which it was removed and mounting the injection nozzle in the hole in end 13 of the cylinder previously occupied by the spark plug. The shaft 28, cam 32, roller 40, rod 39, arm 37, element 41 and member 43 would be removed and shaft 27, cam 29, roller 36, rod 35 and arm 33 would open the exhaust valve and spring 26 would close it. The advantages of this conversion are that it provides economy in manufacture and servicing in the field because of the same structure.

What is claimed is:

1. In a spark ignition engine, a cylinder having a circular wall and an end and provided with an exhaust opening in said end and a plurality of openings in the wall, engine structure secured to the cylinder and providing a chamber for intake air in communication with the plurality of openings, a piston in the cylinder operatively connected to the engine crankshaft, a fuel injection nozzle mounted in the cylinder and operatively connected to a fuel injection pump, fuel control means for varying the amounts of fuel delivered to said nozzle by said fuel injection pump, an exhaust valve plunger slidably mounted in the engine structure and disposed in the exhaust opening, means carried by the engine structure and operatively connected to the engine crankshaft and engaging the plunger for moving the exhaust valve plunger out of the exhaust opening during the exhaust stroke, and means connected to said fuel control means and cooperating with said last-mentioned means for maintaining said plunger open for a certain portion of the compression stroke in inverse proportion to the amount of fuel delivered to said nozzle.

2. In a spark ignition engine, a cylinder having a circular wall and an end and provided with an exhaust opening in said end and a plurality of openings in the wall, a casing secured to the cylinder and providing a chamber for intake air in communication with the plurality of openings, a piston in the cylinder operatively connected to the engine crankshaft, a fuel injection nozzle mounted in the cylinder and operatively connected to a fuel injection pump, fuel control means for varying the amounts of fuel delivered to said nozzle by said fuel injection pump, an exhaust valve plunger slidably mounted in the engine and disposed in the exhaust opening, resilient means engaging the engine and the plunger and urging the plunger to a position closing the exhaust opening, and means carried by the engine operatively connected to the engine crankshaft and engaging the plunger for moving the exhaust valve plunger out of the exhaust opening during the exhaust stroke, and means cooperating with said last-mentioned means and operating responsive to the operation of said fuel control means for maintaining the plunger open for measured portions of the compression stroke in inverse proportion to the amounts of fuel delivered to said nozzle by said fuel injection pump.

3. In a spark ignition engine, a cylinder having a circular wall and an end and provided with an exhaust opening in said end and a plurality of openings in the wall, a casing secured to the cylinder and providing a chamber for intake air in communication with the plurality of openings, a piston in the cylinder operatively connected to the engine crankshaft, a fuel injection nozzle mounted in the cylinder and operatively connected to a fuel injection pump, fuel control means for varying the amounts of fuel delivered to said nozzle by said fuel injection pump, a structure secured to the cylinder, an exhaust valve plunger slidably mounted in the structure and disposed in the exhaust opening, resilient means engaging the structure and the plunger and urging the plunger to a position closing the exhaust opening, and means carried by the structure and operatively connected to the engine crankshaft and engaging the plunger for moving the exhaust valve plunger out of the exhaust opening during the exhaust stroke, and means operating responsive to the operation of said fuel control means for maintaining said plunger open during the compression stroke for certain portions thereof to provide directly proportional amounts of air and fuel in said cylinder.

4. In a spark ignition engine, a cylinder having a circular wall and an end and provided with an exhaust opening in said end and a plurality of openings spaced around the wall, a casing surrounding the cylinder and secured thereto and providing a chamber for intake air in communication with the plurality of openings, a piston in the cylinder operatively connected to the engine crankshaft, a fuel injection nozzle mounted in the cylinder wall and operatively connected to a fuel injection pump, fuel control means for varying the amounts of fuel delivered to said nozzle from said fuel injection pump, a structure secured to the cylinder, an exhaust valve plunger slidably mounted in the structure and disposed in the exhaust opening, resilient means engaging the structure and the plunger and urging the plunger to a position closing the exhaust opening, means for moving the exhaust valve plunger out of the exhaust opening during the exhaust stroke and retarding moving of the valve plunger into the exhaust opening during the compression stroke so as to allow excess intake air to be moved out of the cylinder through the exhaust opening before injecting amounts of fuel into the cylinder which are directly proportional to the amounts of air retained in said cylinder comprising a pair of shafts rotatably mounted in the structure and operatively connected to the engine crankshaft and a cam fixedly secured on each shaft and a first arm pivotally mounted on the structure and the arm engaging the exhaust valve plunger and a first rod mounted in the structure and connected to the first arm and engaging the cam on one of the shafts and a second arm pivotally mounted on the structure and a second rod mounted in the structure and connected to the second arm and engaging the cam on the other of the shafts and an element having a wedge with the wedge being disposed between the second arm and the exhaust valve plunger and a member pivotally mounted on the structure and provided with a slot and a pin fixedly secured on the element and slidably disposed in the slot in the member, and means connecting the other end of the member to the fuel injection governor for moving said wedge between said second arm and said plunger in varying amounts to maintain the exhaust valve plunger open the period necessary to provide amounts of air in said cylinder which are directly proportional to the amounts of fuel delivered to said cylinder by said nozzle.

5. In an internal combustion engine, means for injecting varying amounts of fuel into a cylinder of said engine, an exhaust valve for said engine, means for injecting a volume of air into said cylinder when said exhaust valve is open which is the full volumetric capacity of said cylinder, and means operated by said first means for holding said exhaust valve open during a portion of the compression stroke until the volume of air remaining in the cylinder relative to the amount of fuel injected will satisfy a certain predetermined air-fuel ratio mixture in the cylinder.

6. In an internal combustion engine, a fuel injection governor automatically operating to vary the amount of fuel injected into a cylinder of said engine in a direct proportion to the load upon said engine, an exhaust valve for said engine, means for injecting a volume of air into said cylinder when said exhaust valve is open which is the full volumetric capacity of said cylinder, and means operated by said fuel injection governor for holding said exhaust valve open during a portion of the compression stroke until the volume of air remaining in the cylinder relative to the amount of fuel injected will satisfy a certain predetermined air-fuel ratio mixture in the cylinder.

7. In an internal combustion engine, a fuel injection governor operating to vary the amount of fuel injected into a cylinder of said engine in a direct proportion to the load upon said engine, an exhaust valve for said engine, an air blower operating to inject a volume of air into said cylinder when said exhaust valve is open which is the full volumetric capacity of said cylinder, and linkage means connected between said fuel injection governor and said exhaust valve for holding said exhaust valve open during a portion of the compression stroke until the volume of air remaining in the cylinder relative to the amount of fuel injected will satisfy a certain predetermined air-fuel ratio mixture in the cylinder.

References Cited in the file of this patent

UNITED STATES PATENTS

| | | |
|---|---|---|
| 1,137,142 | Johnson | Apr. 27, 1915 |
| 2,227,853 | Turner | Jan. 7, 1941 |
| 2,773,490 | Miller | Dec. 11, 1956 |

FOREIGN PATENTS

| | | |
|---|---|---|
| 735,002 | Germany | May 4, 1943 |